United States Patent [19]

Jones, Jr. et al.

[11] Patent Number: 4,650,402
[45] Date of Patent: Mar. 17, 1987

[54] AIRCRAFT PROPELLER WITH BLADE PITCH ADJUSTMENT FOR FEATHER AND REVERSE POSITIONS

[75] Inventors: Earl W. Jones, Jr.; Darold L. Neff, both of Piqua, Ohio

[73] Assignee: TRW Inc., Cleveland, Ohio

[21] Appl. No.: 588,234

[22] Filed: Mar. 12, 1984

[51] Int. Cl.⁴ .............................................. B64C 11/38
[52] U.S. Cl. .................................. 416/157 R; 416/46; 416/49; 416/154
[58] Field of Search ................... 416/162, 167, 157 R, 416/48, 154, 46, 49, 50, 153

[56] References Cited

U.S. PATENT DOCUMENTS

| | | | |
|---|---|---|---|
| 2,694,459 | 11/1954 | Biermann | 416/46 |
| 2,807,327 | 9/1957 | Scott | 416/154 |
| 2,911,050 | 11/1959 | Scott | 416/48 |
| 2,986,222 | 5/1961 | Biermann | 416/50 X |
| 3,175,620 | 3/1965 | Newton | 416/154 |
| 3,380,535 | 4/1968 | Biermann . | |
| 3,446,289 | 5/1969 | Morris | 416/50 |
| 3,575,529 | 4/1971 | Bierman | 416/50 X |
| 4,097,189 | 6/1978 | Harlamert | 416/154 X |
| 4,419,050 | 12/1963 | Williams | 416/154 X |
| 4,428,716 | 1/1984 | Maloof | 416/154 X |

*Primary Examiner*—Everette A. Powell, Jr.
*Attorney, Agent, or Firm*—Jacox & Meckstroth

[57] ABSTRACT

A propeller hub supports a plurality of adjustable pitch propeller blades which are rotated by a hydraulic cylinder and control system between a feather position and a reverse position through low and high pitch positions. The reverse pitch position is precisely set by axially adjusting a tubular sleeve threadably connected to the hydraulic cylinder and having an inner end surface forming a stop for the piston within the cylinder. The feather position is precisely set by axially adjusting lock nuts mounted on a threaded end portion of the piston rod projecting forwardly beyond the forward end of the sleeve. The hub also encloses feedback control rods which carry externally adjustable nuts providing for pilot control of the blade pitch into the reverse position.

7 Claims, 2 Drawing Figures

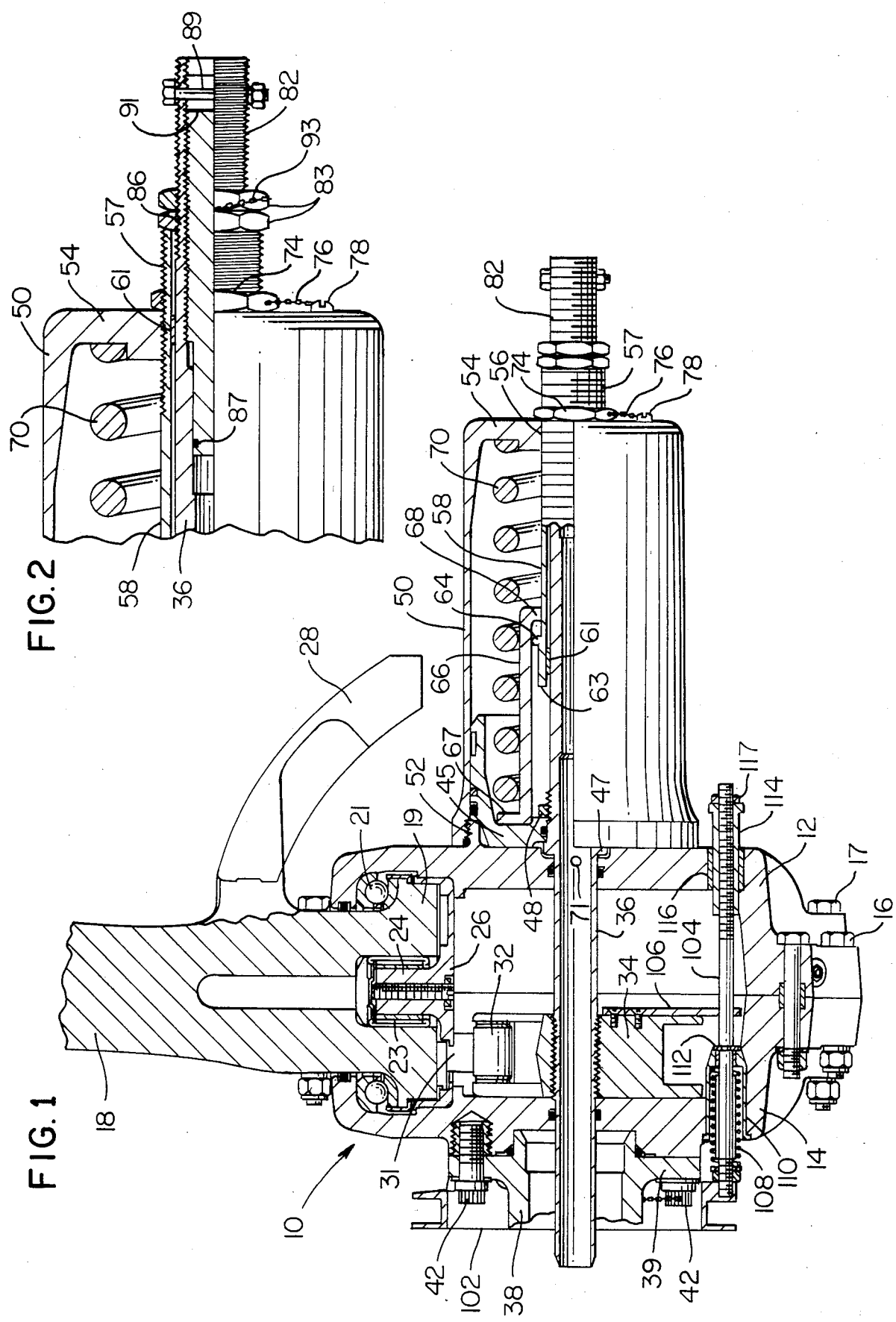

AIRCRAFT PROPELLER WITH BLADE PITCH ADJUSTMENT FOR FEATHER AND REVERSE POSITIONS

BACKGROUND OF THE INVENTION

The present invention relates to variable pitch aircraft propellers of the general type disclosed in U.S. Pat. No. 3,380,535, No. 3,575,529 and No. 4,097,189 assigned to the assignee of the present invention. These propellers usually incorporate a control mechanism for changing the pitch of the propeller blades between a feather position and a reverse position through high and low pitch positions. More specifically, the variable pitch aircraft propeller includes a hydraulic actuating cylinder assembly which rotates with the hub of the propeller and receives hydraulic fluid from a governor unit driven by the aircraft engine. The governor unit preferably incorporates a positive displacement hydraulic pump which supplies hydraulic fluid through a governor control valve actuated by flyball weights responsive to the speed of the engine shaft. The governor control valve operates to maintain the engine speed substantially constant by precisely controlling the pitch of the propeller blades, but can be manually adjusted to change the blade pitch during flight.

As disclosed in above-mentioned U.S. Pat. No. 4,097,189, it is desirable for the aircraft propeller assembly to incorporate stops which limit or precisely establish the pitch of the blades at the feather position and also at the reverse position. As illustrated in this patent, the blade pitch reverse position is determined by an adjustable stop or plug member threadably connected to the forward end of the hydraulic cylinder. The stop for the feather position is provided by an internal shoulder within a tubular sleeve surrounding an annular stop member secured to the forward end of the piston rod. While the stop for the reverse position may be adjusted on the propeller disclosed in U.S. Pat. No. 4,097,189 after the spinner or cover has been removed, the stop for the feather position of the propeller blades may not be easily changed or adjusted without disassembly of the hydraulic cylinder from the propeller hub.

SUMMARY OF THE INVENTION

The present invention is directed to a variable pitch aircraft propeller having a hydraulically actuated pitch change system and which incorporates an improved means for conveniently and precisely adjusting the angle of the blades at both the feather position and the reverse position without requiring disassembly of any portion of the propeller hub or the hydraulic pitch changing mechanism. This primary feature is provided in accordance with the invention by extending a forward end portion of the tubular pitch change rod through a surrounding tubular sleeve threadably connected to the hydraulic cylinder and secured by a lock nut. The forward end portion of the pitch change rod projects forwardly beyond the sleeve and receives a pair of adjustable lock nuts which engage the forward end surface of the sleeve. The axial position of the tubular sleeve is threadably adjusted relative to the hydraulic cylinder according to the desired pitch of the blades at the reverse position, and the rearward position of the pitch change rod is adjusted relative to the sleeve according to the desired pitch of the blades at the feather position.

Other features and advantages of the invention will be apparent from the following description, the accompanying drawing and the appended claims.

BRIEF DESCRIPTION OF THE DRAWING

FIG. 1 is a part axial section and a part elevational view of a portion of a reversing aircraft propeller hub and blade assembly which is constructed in accordance with the invention; and FIG. 2 is an enlarged fragmentary axial section of the forward end portion of the assembly shown in FIG. 1.

DESCRIPTION OF THE PREFERRED EMBODIMENT

The aircraft propeller assembly shown in FIGS. 1 and 2 includes a hub assembly 10 formed by a forward hub section 12 and a rearward hub section 14 which are coupled or clamped together by a series of peripherally spaced bolts 16 and 17. A plurality of angularly arranged propeller blades 18 project radially outwardly from the hub assembly 10, and each blade 18 includes a base portion 19 which is retained by an external anti-friction thrust bearing 21 clamped between the mating hub sections 12 and 14. The base portion of each blade 18 is also supported by an internal preloaded needle bearing 23 mounted on the hub 24 of a base plate 26 confined between the hub sections 12 and 14. A counterweight member 28 is rigidly secured to each propeller blade 18 and normally operates to rotate the blade towards a feather position when the propeller is rotating on the axis of the hub.

An eccentrically located stud 31 projects inwardly from the base portion 19 of each propeller blade 18 and carries a roller 32 which is received or confined within an annular fork member 34. The fork member is rigidly secured to a tubular actuating or pitch change rod 36 which extends axially through the center of the hub 10 and is supported for axial sliding movement by aligned bores formed within the centers of the hub sections 12 and 14. The rearward end portion of the tubular rod 36 extends into the center of a hollow aircraft engine shaft 38 having an outwardly projecting annular flange 39 secured to the hub 10 by a series of peripherally spaced machine screws 42.

The forward end portion of the pitch change rod 36 is secured to a cup-shaped piston 45 which is locked against a flange 47 on the rod 36 by a lock nut 48. The piston 45 is slidably supported within a cylinder 50 having a rearward end portion threadably connected to an annular boss 52 cast as an integral part of the forward hub section 12. The cylinder 50 includes a forward end wall 54 having a threaded center bore 56 which receives a threaded forward end portion 57 of a reverse adjusting sleeve 58 surrounding the forward end portion of the pitch change rod 36. A set of cylindrical composite bushings 61 support the sleeve 58 concentrically with the rod 36, and the inner end portion of the sleeve 58 has an end surface 63 and a surrounding support flange 64.

A spacer tube 66 has an outwardly projecting rearward flange portion 67 engaging the piston 45 and an inwardly projecting forward flange portion 68 slidably engaging the sleeve 58. A compression spring 70 surrounds the tube 66 and extends from the flange portion 67 of the tube 66 to the forward end wall 54 of the cylinder 50 for normally biasing or urging the piston 45 towards the hub section 12. In the retracted position of the piston, the pitch change or actuating rod 36 positions the propeller blades 18 at their feather position.

Hydraulic fluid is introduced into the cylinder chamber defined between the piston 45 and the hub section 12 from the governor unit (not shown) driven by the aircraft engine. The fluid flows through a passage defined within the actuating rod 36 and through a set of holes 71 within the rod 36 rearwardly of the flange 47. A control valve system, as disclosed in above mentioned U.S. Pat. No. 4,097,189, may be used to control the flow of hydraulic fluid through the rod 36 and into the cylinder 50 behind the piston 45.

As best shown in FIG. 2, the threaded forward end portion 57 of the reverse adjustment sleeve 58 receives a jam or lock nut 74 which is tied by a twisted wire 76 to a screw 78 after the lock nut is finally tightened. The pitch change rod 36 includes a threaded forward end portion 82 which projects beyond or forwardly of the forward end surface of the sleeve 58 and receives a pair of jam or lock nuts 83. The tubular end portion 82 of the rod 36 also has an internally threaded bore which receives a plug member 86 for closing the forward end portion of the pitch change rod 36. The plug member 86 carries a resilient sealing ring 87 to confine the hydraulic fluid within the rod 36 and the cylinder 50 rearwardly of the piston 45 which also carries sealing rings. A bolt 89 extends through the forward end portion of the rod 36 and a slot 91 within the forward end of the plug member 86 to lock the plug member within the rod. After the lock nuts 83 are positioned and tightened, a twisted tie wire 93 connects the nuts together to maintain the locked relationship.

As apparent from the drawing and the above description, a propeller assembly constructed in accordance with the invention provides for precisely adjusting the feather position of the blades 18 and also the reverse pitch position of the blades without requiring disassembly of the cylinder 50 from the hub 10. That is, the pitch of the blades at the reverse pitch position is precisely determined or set by releasing the lock nut 74 and adjusting the sleeve 58 within the cylinder wall 54 to position the end stop surface 63. When the piston 45 is fully extended by hydraulic pressure, the lock nut 48 engages the rearward end surface 63 which establishes the precise angle or pitch of the blades in the reverse pitch position. After this position is set, the lock nut 74 is tightened and wired. The lock nuts 83 are then adjusted on the threaded forward end portion 82 of the pitch change rod 36 to establish a stop for the rearward movement of the rod 36 and the piston 45 and thereby establish the precise pitch of the blades 18 at the feather position. At this selected position, the lock nuts 83 are tightened and wired, and the spinner or cover for the hub 10 and cylinder 50 may be installed.

The propeller assembly shown in FIG. 1 also incorporates a pitch feedback control system of the general type disclosed in above mentioned U.S. Pat. No. 3,575,529. This system is commonly referred to as the "Beta" control system and includes an axially movable concentric ring 102 adapted to receive a yoke member, for example, as shown in U.S. Pat. No. 3,575,529. The ring member 102 is supported by a series of circumferentially spaced and axially extending rods 104 which extend through the hub 10 and corresponding clearance holes within a plate 106 mounted on the forward end surface of the fork member 34 within the hub 10. A compression spring 108 surrounds the rearward end portion of each rod 104 and is confined within a tubular sleeve 110 mounted within the hub section 14. A retaining ring 112 is mounted on each rod 104 and normally engages the forward end surface of the sleeve 110 as a result of the force exerted by the compression springs 108 rearwardly against the ring member 102. A tubular adjusting nut 114 is threaded onto the forward end portion of each rod 104 and projects forwardly from the hub 10 through a corresponding bushing 116 mounted within the hub section 12. The inner end surfaces of the adjusting nuts 114 are adapted to be engaged by the plate 106 when the fork member 34 moves forwardly towards the reverse pitch position.

After the plate 106 engages the nuts 114, the rods 104 move forwardly with the fork member 34 so that the ring member 102 moves with the fork member 34 as the blades 18 are shifted to a reverse pitch position As described in the above mentioned U.S. Pat. No. 3,575,529, the ring member 102 provides the aircraft pilot with a direct control for changing the pitch of the blades into the reverse pitch position. The point at which the forward movement of the fork member 34 picks up or engages and moves the rods 104 and ring member 102 may be precisely selected by adjusting the nuts 114 on the rods 104 after which the nuts are secured by the lock nuts 117. As apparent from FIG. 1, all of the control rods 104 extend through the hub 10 and are supported by the hub, but the nuts 114 may be conveniently adjusted without disassembling any portion of the hub 10.

While the propeller assembly herein described constitutes a preferred embodiment of the invention, it is to be understood that the invention is not limited to this precise assembly, and that changes may be made therein without departing from the scope and spirit of the invention as defined in the appended claims The invention having thus been described, the following is claimed:

1. In an aircraft propeller assembly including a propeller hub defining an internal chamber and adapted to be driven by an engine, said hub supporting a plurality of angularly disposed adjustable pitch propeller blades, pitch changing means including a hydraulic fluid cylinder projecting forwardly from said hub and surrounding a slidable piston mounted on a tubular pitch change rod extending on the axis of propeller rotation, means for changing the pitch of said blades between a feather position and a reverse pitch position through high and low pitch positions in response to axial movement of said pitch change rod with said piston, means for directing hydraulic fluid into said cylinder behind said piston, and spring means for urging said piston and said pitch change rod toward said feather position, the improvement wherein said pitch change rod includes an externally threaded end portion projecting forwardly from said cylinder on the axis of propeller rotation, a tubular sleeve surrounding said threaded portion of said pitch change rod in concentric relation, said sleeve including an inner end portion disposed for stopping the forward movement of said piston within said cylinder, said sleeve further including an externally threaded portion threadably connected to said cylinder and projecting forwardly from said cylinder, said sleeve being adjustable within said cylinder on the propeller axis for precisely adjusting said reverse position of said blades, and at least one axially adjustable nut member mounted on said threaded end portion of said pitch change rod forwardly of said sleeve and cooperating with said sleeve for precisely adjusting said feather position of said blades.

2. An aircraft propeller assembly as defined in claim 1 and including means for locking said threaded portion of said sleeve to said cylinder.

3. An aircraft propeller assembly as defined in claim 1 and including means for locking said nut member to said threaded end portion of said pitch change rod.

4. An aircraft propeller as defined in claim 1 and including a plurality of reverse pitch control rods extending axially through said hub and having rearward end portions connected to a control ring, a corresponding plurality of tubular nuts threadably engaging said rods, said tubular nuts projecting through said hub and having inner end portions within said chamber, said pitch changing means including a member mounted on said pitch change rod within said chamber and positioned to engage said inner end portions of said tubular nuts when said pitch change rod and said member move forwardly toward said reverse pitch position, and said tubular nuts have forward end portions disposed in front of said hub to provide for precisely adjusting when said control rods move axially with said pitch change rod.

5. An aircraft propeller assembly as defined in claim 1 wherein said externally threaded end portion of said pitch change rod is tubular, and a plug member threadably mounted within said tubular end portion of said pitch change rod.

6. In an aircraft propeller assembly including a propeller hub defining an internal chamber and adapted to be driven by an engine, said hub supporting a plurality of angularly disposed adjustable pitch propeller blades, pitch changing means including a hydraulic fluid cylinder projecting forwardly from said hub and surrounding a slidable piston mounted on a tubular pitch change rod, means for changing the pitch of said blades between a feather position and a reverse pitch position through high and low pitch positions in response to axial movement of said pitch change rod with said piston, means for directing hydraulic fluid into said cylinder behind said piston, spring means for urging said piston and said pitch change rod toward said feather position, and a plurality of reverse pitch control rods extending axially through said hub and having rearward end portions connected to a control ring, the improvement compressing a corresponding plurality of tubular nuts threadably engaging said rods, said tubular nuts projecting through said hub and having inner end portions within said chamber, said pitch changing means including a member mounted on said pitch change rod within said chamber and positioned to engage said inner end portions of said tubular nuts when said pitch change rod and said member move forwardly toward said reverse pitch position, and said tubular nuts have forward end portions disposed in front of said hub to provide for conveniently and precisely adjusting when said control rods move axially with said pitch change rod.

7. An aircraft propeller assembly as defined in claim 6 wherein said pitch change rod includes an externally threaded forward end portion projecting forwardly from said cylinder on the axis of propeller rotation, a tubular sleeve surrounding said forward end portion of pitch change rod in concentric relation and threadably engaging said cylinder for axial adjustment, and at least one adjustable nut member mounted on said threaded forward end portion of said pitch change rod forwardly of said sleeve.

* * * * *